May 23, 1939.　　P. HORINSTEIN　　2,159,328
INDICATING APPARATUS
Filed May 21, 1937　　2 Sheets-Sheet 1

Inventor:
Philip Horinstein
By Forman L. Mueller
Atty.

May 23, 1939.  P. HORINSTEIN  2,159,328
INDICATING APPARATUS
Filed May 21, 1937   2 Sheets-Sheet 2

Inventor:
Philip Horinstein
By Foorman L. Mueller
Atty.

UNITED STATES PATENT OFFICE 2,159,328

INDICATING APPARATUS

Philip Horinstein, Chicago, Ill.

Application May 21, 1937, Serial No. 144,035

4 Claims. (Cl. 116—124.1)

This invention relates to indicating apparatus and particularly to dial-like indicators, such as radio dials and clock dials, although in some of its aspects it is applicable to other indicators as well.

Radio receiving sets comprise one of the greatest fields for the present invention, because of the problems there presented which are solved by this invention. In radio receiving sets it is now common to provide what is called multiband reception, in which, by the turn of a switch, the set can be changed from the reception of broadcast to the reception of short waves and in some instances intermediate waves. With each band of frequencies to which it is adjusted, a different scale of calibrations is used, and there have been various devices for indicating to the operator which one of the scales he should read. The present invention solves this problem by making all but one of the scales completely invisible, and this is done without the use of any moving parts in the dial mechanism. This is accomplished by the use of semitransparent mirrors together with special illuminating means for each dial, the dials being located behind the semitransparent mirror so that they are not visible except when individually illuminated. If desired, the indicator and portions of the dial may be positioned in front of the semitransparent mirror so that these will be visible at all times. Furthermore, one or more of the dials may be provided with a third dimension effect, as discussed below, so as to not only make this dial more decorative but to give it such a different character that the difference between the dials is apparent without any conscious thought.

Another problem which is aggravated by the use of a plurality of scales in radio receiving sets, but which is also common in other sets, such as in instrument panels of automobiles, is the problem of maintaining a satisfactory appearance in spite of the presence of either a large dial or numerous dials. According to this invention, this problem is solved by virtue of the fact that the semitransparent mirrors mentioned above appear to be ordinary mirrors when the dial behind them is not illuminated, and hence they are highly decorative.

Additional objects will be apparent from the following description and from the drawings, in which.

Figure 1:
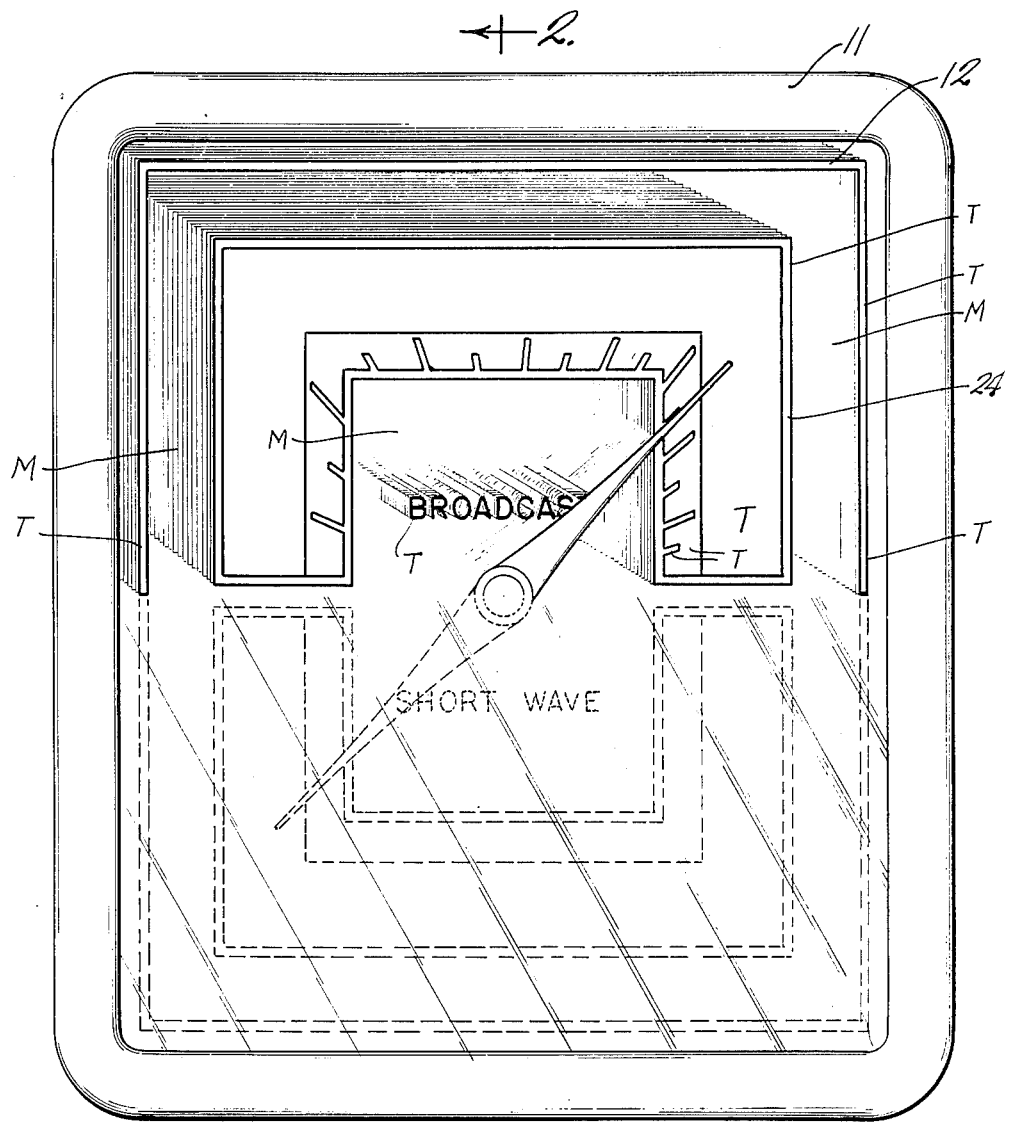
Fig. 1 is a face view of one embodiment of my invention, with the upper half thereof illuminated, the third dimensional effect being indicated thereon.

Although this invention may take numerous forms, only a few have been chosen for illustration. All forms of the invention comprise some sort of an indicator usually enclosed in a housing 10, of which only the frame 11 is visible in Fig. 1, and including a transparent mirror 12 behind which is positioned some illuminating means such as the lamps 13 or 14, preferably shielded and concentrated by a reflector 16. The transparent mirror is a sheet of glass coated on one side with a very thin layer of silver, which reflects a large proportion of the light striking it, letting the rest pass therethrough, as through clear glass. The result is that with the objects behind the transparent mirror in darkness, the mirror appears as a true mirror, and when the objects behind the transparent mirror are brightly illuminated they are clearly visible as though the mirror were a sheet of clear glass. Such transparent mirrors are often called semitransparent mirrors, but the shorter term is preferred for simplicity. The thin silver coating is usually protected by a coating of clear shellac or the like.

Invisible indicators

According to the present invention, in which the transparent mirrors are applied to indicating devices, various benefits are obtained. One of these is the ornamental benefit of having the indicator apparently replaced by a mirror whenever it is not in use. Such a benefit can be obtained by all types of indicators, such as clock faces, radio dials, the instruments on an automobile instrument panel, and the like. The lower half of Figs. 1 and 2, when considered alone, is typical of this benefit. In these figures there is positioned behind the transparent mirror 12 an indicating vane 18 carried by a shaft 19 which rotates with the tuning element of the radio receiving set so that the vane 18 indicates the frequency to which the set is tuned in the usual way, being positioned in front of a dial 21 which in this instance is of a translucent nature. Light from the lamp 14, when it is turned on, will illuminate the dial 21 by passing therethrough in sufficient intensity so that it will be clearly visible behind the transparent mirror 12. On the other hand, when the lamp 14 is turned off, so little light will pass inwardly through the transparent mirror 12 that it will appear to be a full mirror and nothing will be visible behind it.

The dial 21 may be formed of glass, with the dial markings and background therefor printed thereon with suitable translucent paint, or it may comprise any other translucent material treated in a similar way, or paper with the characters printed thereon and rendered translucent in any suitable manner. The characters can be made quite evident by having either the characters or the field opaque and the other transparent, but it is preferred that both be transparent and that the contrast be obtained by providing them in different colors. The advantage of this is in passing more light through the dial 21 to illuminate the vane 18.

Selective indications

Figure 2:
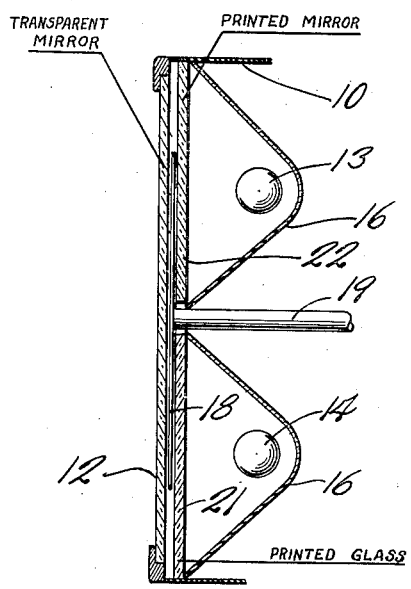
Fig. 2 is a somewhat diagrammatic vertical sectional view taken on the line 2—2 of Fig. 1.

Another benefit which can be obtained by the use of a transparent mirror in indicating devices is evident from considering Figs. 1 and 2 as a whole. It is now quite common in receiving sets to have the set operative, by simple adjustments, throughout a plurality of different bands, such as the broadcast band and the short wave band. It is desirable, of course, to have some way of indicating which scale of calibrations is to be used. By the use of the transparent mirror together with separate lights 13 and 14, one for the broadcast band and one for the short wave band, only that scale which is to be used is visible. Thus, when the set is adjusted for the broadcast band, the light 13 will be illuminated, making the broadcast dial 22 clearly visible and leaving the dial 21 substantially invisible because of being in darkness. On the other hand, when the set is adjusted for short wave reception the lamp 14 will be lit, making the dial 21 clearly visible and leaving the dial 22 substantially invisible in darkness. This arrangement is not only advantageous in absolutely preventing any confusion as to which dial should be read, since only one is visible, but is also advantageous because it leaves the other half of the face of the instrument available for use as a mirror and with the attendant decorative effects.

Third dimensional effect

The dial 22 is preferably formed as a mirror except for the transparent portion thereof, which is printed to show the indicia and the background therefor and any other decoration desired. The result of this is that light passing through the translucent portions is reflected back and forth between the mirror 22 and the translucent mirror 12 to produce a third dimensional effect, as seen clearly in Fig. 1. To make this more clear, the mirror portions of the dial as seen in Fig. 1 have been labeled "M", and the translucent portions have been marked "T", the lines separating adjacent translucent portions merely indicating the presence of contrasting colors. It is probably best that the border 24 be in white or some very light color, since this produces the best third dimensional effect. More reflections are visible with a border of white than with a border of any other color. Of course any dial arrangement or design may be used. It is preferred that the scale calibrations be surrounded by a non-reflective surface as shown so that there will be no confusion in the nature of double vision as to the scale or the portion of the vane in front of the scale.

Emphasized distinctions

It will be observed that in Fig. 2, the upper dial 22 is in the form of a mirror to produce third dimensional effect, while the lower dial 21 is a nonreflective dial to avoid the third dimentional effect. This has an advantage in presenting such a noticeably different appearance of the two dials that the user comes to unconsciously associate the third dimensional effect with broadcast and the flat effect with short wave, and he is always aware, perhaps subconsciously, of which band his set is adjusted to receive. It should be understood, however, that the third dimensional effect may be used or avoided whenever desired. Thus, in all of the embodiments of the present invention, the dial or other indicator may be formed of a mirror to provide the third dimensional effect or of a nonreflective dial such as printed glass to avoid the third dimensional effect. This is true, regardless of the fact that the description of the embodiment may specify one form or the other.

Permanent visibility

In some instances it will be desired to have the indicator vane, and possibly the scale as well, visible at all times and to have only the background and other decorations or legend hidden or optionally rendered visible by the transparent mirror. This can be accomplished as shown in Fig. 3 by positioning the indicator vane 28 behind a clear glass 29, which need only be provided for protection of the vane 28.

Figure 3:
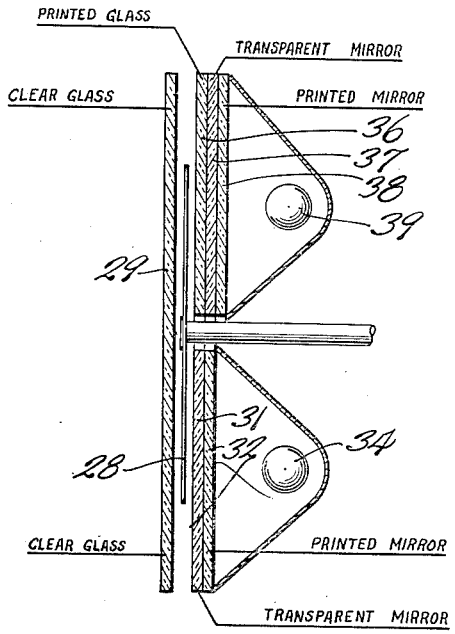
Fig. 3 is a corresponding view of a modification of the invention.

As shown in the lower half of Fig. 3, a transparent mirror 31 may be positioned immediately behind the vane 28, and a mirror dial 32 similar to the dial 22 may be positioned immediately behind the transparent mirror 31. This arrangement will render the dial entirely invisible when the light 34 is off, though the indicator vane 28 will be visible. When the light 34 is lit, the dial 32 will be clearly visible, with its edges and decorative features shown with third dimensional effect, as seen in Fig. 1.

In instances where it is desirable to have something more than the indicating vane 28 visible, a clear glass 36 may be provided having the indicia alone, preferably without any background or other indications visible thereon. This will render the indicia together with the indicating vane 28 visible at all times. The glass plate 36 may be called a front dial. Behind the front dial 36 may be positioned a transparent mirror 37 and a back dial 38 such as a printed mirror, which will ordinarily be invisible but which will show up with a third dimensional effect when the lamp is lit.

The combination shown in Fig. 3 is also very desirable for multiband receiving sets, since the indicator vane 28 together with the broadcast scale can be visible at all times, even when the set is turned off. When the set is turned on and adjusted to either short wave or broadcast, the appearance will be sufficiently different to avoid any confusion.

Vaneless indicators

Figure 4:
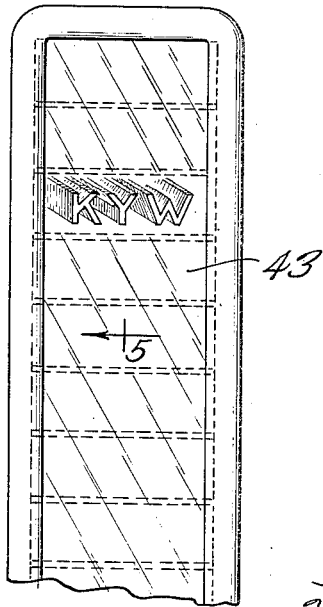
Figs. 4 and 5 are fragmentary face and vertical sectional views of another modification of the invention in which one of a plurality of signals is made visible.
Figure 5:
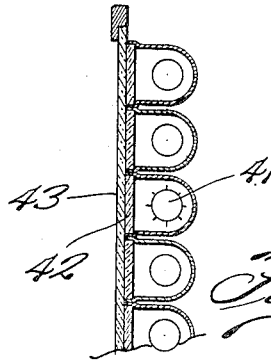

In Figs. 4 and 5 has been indicated a vaneless type of indicator, which would be very desirable for use with the modern automatic tuning sets, in which the station selecting device is moved to a relatively small number of pre-set positions. In such a situation the station to which the set is tuned could be indicated by providing a lamp for each of the pre-set adjustments, each lamp having its own dial 42 behind a transparent mirror 43. It will be evident, as indicated by Fig. 4, that all of the dials would be invisible behind the transparent mirror 43 except the one illuminated dial. It may readily be understood that the flashing of signal letters on a mirror presents a very neat effect, which may be heightened by adding the third dimensional feature, as when the dials 42 are formed by mirrors such as the dial 22. Local stations can be distinguished from distant stations by using the third dimensional effect for one and not the other. Such mirror indicators can also be used very advantageously for annunciator boards, elevator signals and the like.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention, except as may be required by prior art.

I claim:

1. Indicating apparatus including a movable indicator, a front dial for the indicator including some indicia with respect thereto, a transparent mirror behind the front dial, and a rear dial behind the transparent mirror including further indicia for the indicator, and means for illuminating the rear dial at will to render it visible or invisible.

2. Indicating apparatus including a movable indicator, a front dial for the indicator, including some indicia with respect thereto, a transparent mirror behind the front dial, a rear dial behind the transparent mirror including further indicia for the indicator, means for illuminating the rear dial at will to render it visible or invisible, and reflective means associated with the rear dial to coact with the transparent mirror in reflecting a plurality of images of a portion of the rear dial to produce a third dimensional effect.

3. In apparatus of the character described, the combination of: an indicator, a front dial for the indicator, a transparent mirror arranged behind the said front dial, a rear dial behind the said transparent mirror, and means for illuminating the said rear dial.

4. An indicating apparatus including a movable member, stationary means relative to which said member moves to give an indication, said stationary means comprising a transparent mirror and a source of light and a mirror and a dial unit between said transparent mirror and said source of light, said unit comprising an opaque mirror with light passages therethrough and translucent dial delineations registering with said passages so as to be illuminated by said source of light, the reflecting surface of said opaque mirror facing said transparent mirror, said transparent mirror being positioned between said movable member and said dial unit, and said indicating apparatus including a second transparent delineation-bearing member positioned between said movable member and said transparent mirror.

PHILIP HORINSTEIN.